United States Patent

Maurice et al.

[11] Patent Number: 5,859,531
[45] Date of Patent: Jan. 12, 1999

[54] DISPLACEMENT APPARATUS USING A MAGNETIC OPTIC SENSOR AND POSITION DEPENDENT MAGNETIC FIELD

[76] Inventors: Lisa Brackenbury Maurice, RD 1, P.O.Box 3891, 4 Gabaree Ln., Jericho, Vt. 05465; Robert Downing LaClair, RD #1, Box 42, Richmond, Vt. 05477

[21] Appl. No.: 686,900

[22] Filed: Jul. 25, 1996

[51] Int. Cl.[6] ............ G01R 33/032; G02F 1/09; G02B 5/30
[52] U.S. Cl. ............ 324/207.13; 324/207.24; 324/207.25; 324/244.1; 324/96; 250/227.17
[58] Field of Search ............ 324/207.2, 207.21, 324/207.13, 207.11, 207.14, 207.22, 207.23, 207.24, 207.25, 207.26, 173, 244.1, 174, 175, 96; 338/32 R, 32 H; 250/227.17, 225, 227.21, 231.1

[56] References Cited

U.S. PATENT DOCUMENTS

| | | | |
|---|---|---|---|
| 4,529,875 | 7/1985 | Brogardh et al. | 250/227 |
| 4,570,118 | 2/1986 | Tomczak et al. | 324/207.2 |
| 4,658,214 | 4/1987 | Petersen | 324/207.24 |
| 4,746,859 | 5/1988 | Malik | 324/207.25 |
| 4,812,767 | 3/1989 | Taketomi | 324/244 |
| 4,931,635 | 6/1990 | Toyama | 250/225 |
| 4,947,035 | 8/1990 | Zook et al. | 250/225 |
| 5,059,783 | 10/1991 | Stranjord et al. | 250/227.19 |
| 5,149,962 | 9/1992 | Maurice | 324/207.13 |
| 5,493,211 | 2/1996 | Baker | 324/130 |
| 5,493,216 | 2/1996 | Asa | 324/207.24 |
| 5,574,365 | 11/1996 | Oyama et al. | 324/207.21 |

FOREIGN PATENT DOCUMENTS

| | | | |
|---|---|---|---|
| 56-55811 | 5/1981 | Japan . | |
| 0134601 | 6/1986 | Japan | 324/207.24 |

*Primary Examiner*—Jay M. Patidar
*Attorney, Agent, or Firm*—William E. Zitelli; Leonard L. Lewis

[57] ABSTRACT

Apparatus for detecting relative displacement includes a first magnet for producing a first magnetic field along an axis; a second magnet for producing a second magnetic field along the axis; the first and second magnetic fields interacting to produce a position-dependent magnetic field along the axis; a sensor disposed for detecting the position-dependent magnetic field; and a movable element for causing relative displacement between the position-dependent magnetic field and the sensor. In a preferred embodiment, the sensor is a magneto-optic sensor.

14 Claims, 2 Drawing Sheets

DISPLACEMENT APPARATUS USING A MAGNETIC OPTIC SENSOR AND POSITION DEPENDENT MAGNETIC FIELD

BACKGROUND OF THE INVENTION

The invention relates generally to position and displacement sensors, and more specifically to such sensors using magnetically responsive sensors.

Position and/or displacement sensors are generally known and are commonly used in applications where there is a need to monitor or detect the absolute and/or relative position or movement of an element. A typical example would be for detecting the extension of a push rod in a cylinder or other type of linear or rotary actuator.

A conventional position or displacement sensor detects movement of a ferrous rod within a set of matched coils, such as the well known arrangement of a linear variable differential transducer or LVDT. Unfortunately, such devices are susceptible to noise and particularly electromagnetic interference (EMI).

The objectives exist, therefore, to provide an accurate and reliable position/displacement sensor that exhibits good noise immunity without excessive production cost.

SUMMARY OF THE INVENTION

To the accomplishment of the forgoing objectives, the invention provides, in one embodiment, an apparatus for detecting displacement comprising first magnetic means for producing a first magnetic field along an axis; second magnetic means for producing a second magnetic field along said axis; said first and second magnetic fields interacting to produce a position-dependent magnetic field along a portion of said axis; a sensor disposed for detecting said position-dependent magnetic field and for producing an output indicative thereof; and means for causing relative displacement between said position-dependent magnetic field and said sensor.

The invention also contemplates the methods embodied in the use of such an apparatus, as well as a method for detecting displacement comprising the steps of:

a. using two magnetic field means to provide a position-dependent magnetic field along a displacement axis;

b. using a sensor to detect said magnetic field; and c. displacing the position-dependent magnetic field relative to the sensor.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 4A is a representative graph of a typical optical response for a sensor suitable for use with the present invention, while

DETAILED DESCRIPTION OF THE INVENTION

Figure 1:
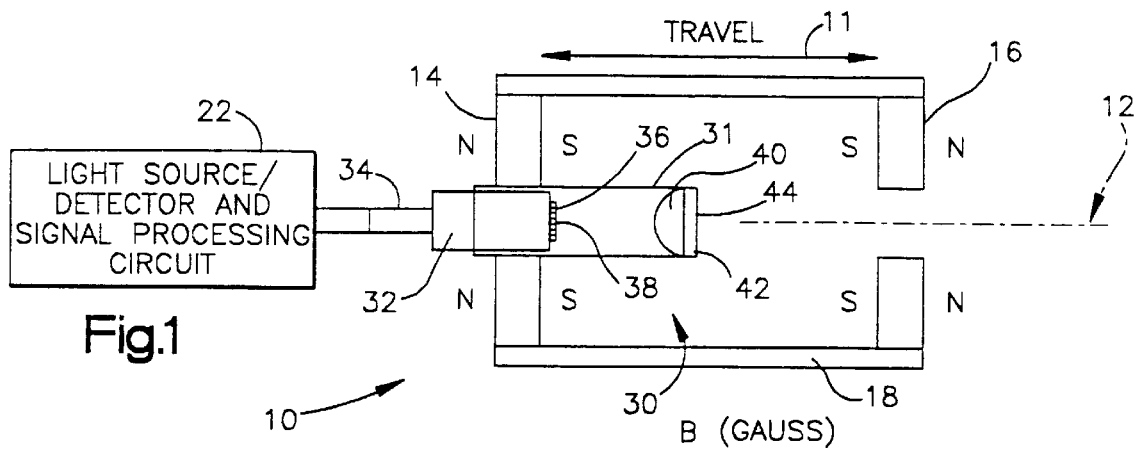
FIG. 1 is a simplified schematic diagram of one embodiment of the invention.

FIG. 1 illustrates a basic arrangement for one embodiment of the present invention. An apparatus for detecting position/displacement, such as of a movable member (not shown) for example, is generally indicated with the numeral 10. In this embodiment, the invention is utilized for detecting translational position and/or movement such as linear movement along an axis 12 (such direction of movement being indicated by the arrow 11 in FIG. 1). However, those skilled in the art will readily appreciate from the disclosure herein that the invention can be used to detect rotational, angular and non-linear movement and position variations.

The apparatus 10 includes a pair of ring magnets 14, 16 disposed at respective ends of a housing or mounting tube 18. The housing 18 can be attached or otherwise coupled, linked or connected to an element the position or movement of which is to be detected. The ring magnets 14, 16 in this case are disposed so that like poles face each other. In the embodiment of FIG. 1, the south poles face each other.

Figure 2:
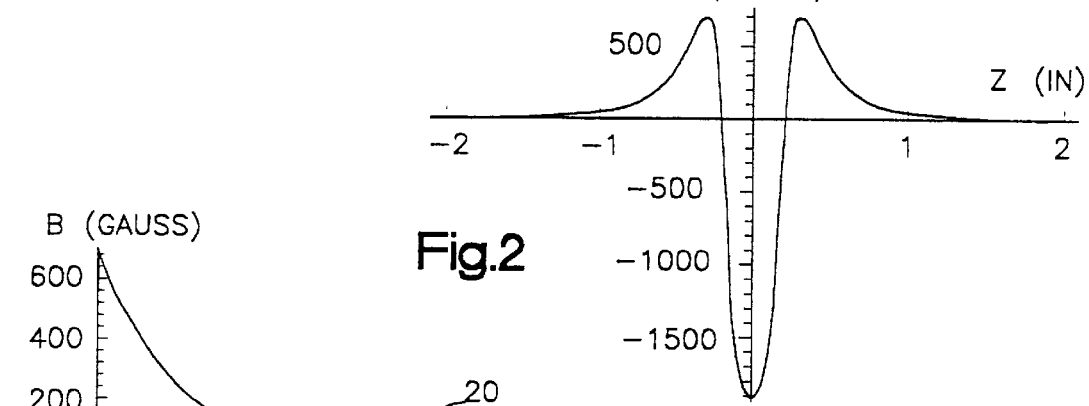
FIG. 2 is a representative graph illustrating a typical axial magnetic field for one of the magnets used in the embodiment of FIG. 1.
Figure 3:
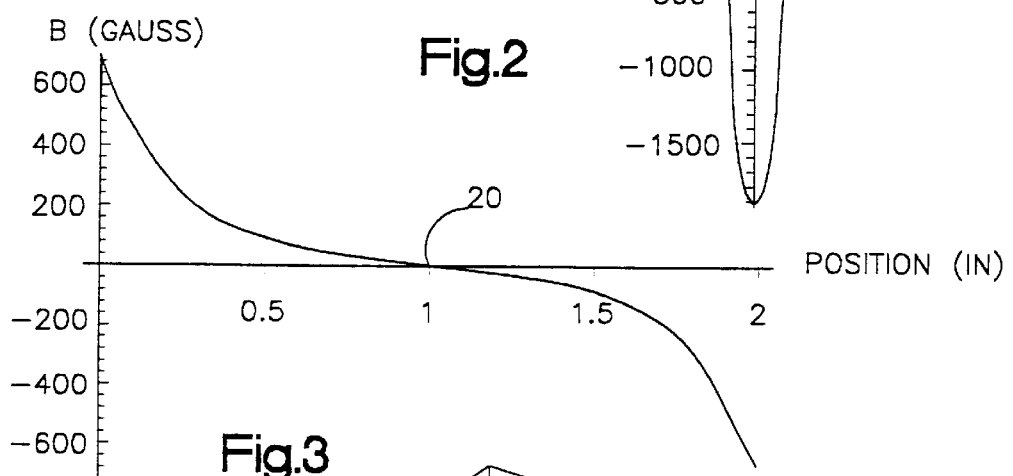
FIG. 3 is a representative graph of a position-dependent magnetic field produced by a pair of magnets such as used in the embodiment of FIGS. 1 and 2.

FIG. 2 illustrates a typical axial magnetic field for a single ring magnet, showing magnetic field strength in Gauss vs. distance from the magnet center. By using two reasonably matched magnets 14, 16 disposed as in FIG. 1, a generally uniform and position-dependent magnetic field is provided along the axis 12 of the housing 18. FIG. 3 illustrates one example of such a position-dependent field for a 2 inch stroke apparatus 10. Since the magnets 14,16 are disposed in the housing 18 in an opposing manner, a net zero magnetic field is produced about at the midpoint 20 between the magnets, and on either side of the midpoint the magnetic field intensity increases but with opposite polarity. By polarity of the field is simply meant that the axial direction of the net magnetic field is in a first direction on one side of the midpoint 20 and in an axially and generally opposite direction on the other side of the midpoint 20. Of course, not all of the magnetic flux is axial, but the axial fields are the ones of interest in this embodiment for reasons that will be apparent as follows.

The apparatus 10 of FIG. 1 further includes a magnetic field sensor 30, such as, for example, a magneto-optic sensor. Although the invention is not limited to a specific sensor design, a particularly useful sensor arrangement is described in U.S. Pat. No. 5,149,962, the entire disclosure of which is fully incorporated herein by reference. For example, the proximity detector design described in the patent could be used, but modified to operate in a linear region wherein the sensor responds to the position-dependent magnetic field of FIG. 2 herein, for example, rather than as a binary proximity switch. The modifications are straightforward following the teachings of the '962 patent, with the primary modification being the selection of a magneto-optic film that preferably does not saturate in the position-dependent magnetic field and exhibits good sensitivity to smaller changes in the magnetic field (e.g. causes a detectable polarization rotation for smaller magnetic flux changes). The sensor described in the referenced '962 patent can be further modified in that the ring magnet is not used as part of the sensor itself because the magnetic field of interest is provided in the present invention by the two ring magnets 14, 16. Alternatively, for convenience one of the magnets 14, 16 of FIG. 1 herein could be integrally housed with the sensor 30 as shown in the '962 patent.

For the magnetic field example illustrated in FIGS. 2 and 3 herein, a suitable magneto-optic material is F157H2 available from AT&T that exhibits 22.5° polarization rotation at a saturation field of about 700 Gauss. A detailed description of the basic sensor 30 (modified as indicated above) as well as a useful design for a signal processing circuit 22 will be found in the referenced '962 patent and therefore will not be repeated in detail herein. The basic elements of the sensor 30 are as follows.

The sensor 30 includes a housing 31 that holds a ferrule 32 that is optically coupled to at least a pair of optic fibers in an optical cable 34. The optical cable is coupled at one end to an electronic circuit 22. The circuit 22 includes a light source and detector such as a pair of LED devices, as well as signal processing circuits for analyzing the optical signals returned from the sensor 30.

A pair of polarizing elements 36, 38, each of which serves both as an input polarizer and as an analyzer are disposed on one end of the ferrule 32. Each polarizing element 36, 38 functions as a polarizer and analyzer because of the self-referencing bi-directional interrogation technique used herein and described in detail in the referenced '962 patent.

A plano-convex lens 40 is disposed near an opposite end of the housing 31 adjacent a magneto-optic (Faraday) material 42. In this embodiment, the magneto-optic material 42 is provided with a mirrored back side 44 to provide a folded optical path as described in the referenced '962 patent.

Preferably, the sensor 30 is fixed in position and the outer housing 18 is adapted to move in response to the element being monitored. However, the apparatus 10 could be used in such a manner that the sensor 30 is moved and the housing 18 is fixed. In either case, the sensor 30 is used to determine or detect relative movement of the position-dependent magnetic field produced by the two magnets 14,16 with respect to the sensor 30.

An optical path for light transmitted through the sensor 30 is generally in a direction parallel with the axial magnetic field along the axis 12 so as to maximize the Faraday effect as the polarized light passes through the magneto-optic material 42. The polarizing elements 36, 38 typically are aligned with a 45° offset with respect to each other so that the polarization rotation of the light can be easily detected. The rotation effect is proportional to the magnetic field strength and polarity as set forth in the referenced patent.

Figure 4A:
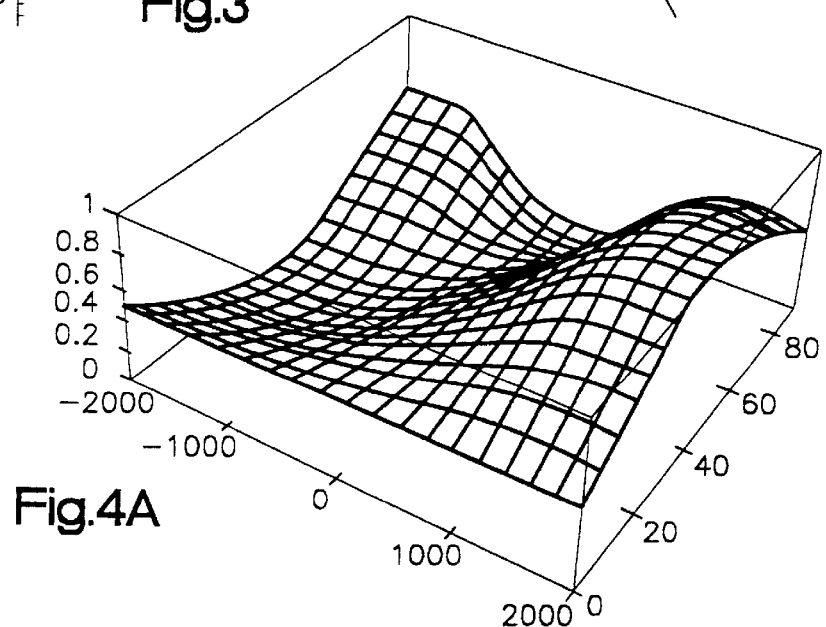

With reference to FIG. 4A, a typical optical response for the sensor 30 is graphically illustrated. This illustration is a three dimensional plot of detected light intensity (vertical axis) versus magnetic field strength (horizontal axis) for various Faraday rotation angles Thf (normal axis). The illustration is a modeled response based on the use of polarizing elements 36, 38 offset by 45° with respect to each other. Note that the sensor 30 exhibits best sensitivity when the Faraday rotation angle of the Faraday material 42 reasonably matches the offset angle of the polarizing elements 36, 38 (in this case 45°). This design feature holds for other offset angle selections. When thin Faraday films are used in the sensor 30, diffraction effects are observed and accordingly dictate that the polarizing element 36, 38 offset must be other than 0° in order to detect variations in the magnetic field.

Figure 4B:
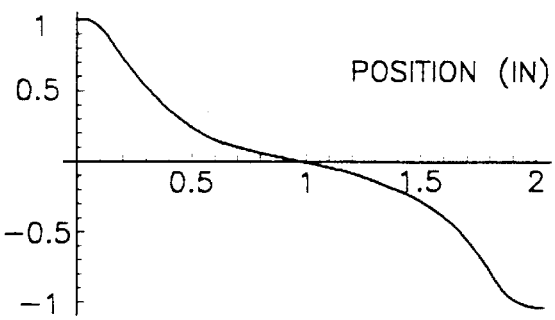
FIG. 4B is a representative graph of a difference over sum signal processing output for such an optical sensor that detects the magnetic field of FIGS. 1–3.

As described in the '962 patent, light is preferably transmitted along the optical path through the sensor 30 in an alternating bi-directional manner. With the polarizing elements offset by 45°, and due to the non-reciprocal nature of the Faraday effect, light traveling along the optical path in one direction will be polarization modulated in an inverse manner compared to light traveling along the same optical path through the sensor 30 but in an opposite direction. Thus, this technique allows the use of difference over sum signal processing to provide self-referenced optical output signals. FIG. 4B illustrates in a representative manner a typical difference over sum output signal produced by a bi-directional sensor 30 in response to the position-dependent magnetic field of FIG. 3.

Although the use of a self-referenced optical sensor 30 is preferred, those skilled in the art will readily appreciate that the invention can be realized with the use of different optical sensor designs that are not inherently self-referenced optical sensors, albeit with some compromise as to the inherent reliability of the optical output signals due to possible variations in the optical response of the sensor, light source, detector and processing circuits. Other optical sensors designs that use different self-referencing techniques such as second wavelength interrogation can also be used if so desired for a particular application.

The sensor 30 can conveniently be disposed so that the ring magnet 14 can slide along the sensor housing 31. The apparatus 10 can be sealed if so needed for a particular application. The use of an optical sensor 30 for detecting the position-dependent magnetic field is preferred for EMI and noise immunity, however, those skilled in the art will readily appreciate that other types of magnetically responsive sensors could be conveniently used with the invention.

Figure 5:
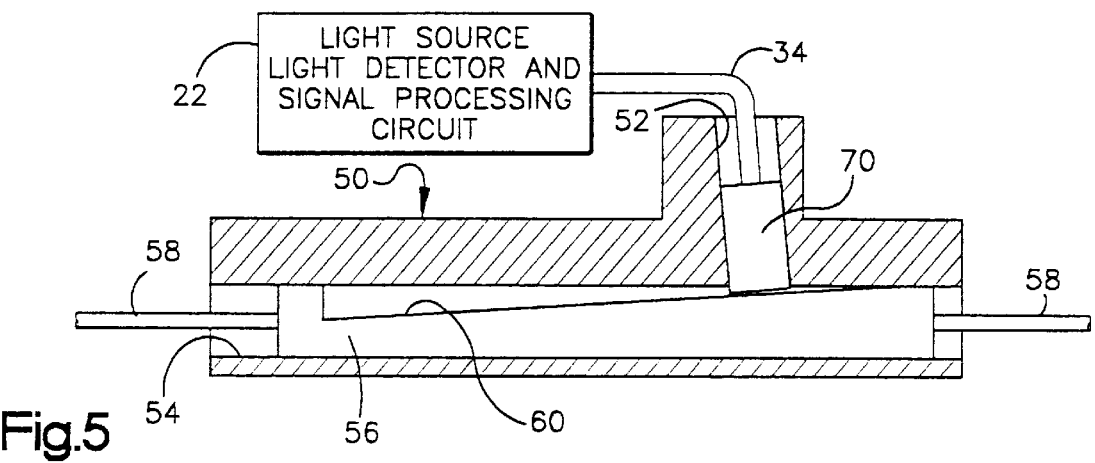
FIGS. 5–8 are simplified schematic diagrams of other embodiments of the invention.

With reference next to FIG. 5, another embodiment of the invention is illustrated. In this embodiment, an optical sensor 70 can be used as described previously herein. However, in this embodiment, the sensor 70 includes a ring magnet disposed in the sensor housing as in the referenced '962 patent. The sensor 70 is disposed in a slider block 50 through a bore 52. The block 50 can be conveniently formed from molded or machined plastic, for example, or other suitable non-magnetic materials. The block 50 includes an extended bore 54 which slidably receives an inclined slider or target 56. The slider 56 comprises a ferromagnetic target that modulates the sensor 70 magnetic field. The slider 56 is attached by arms 58 or other suitable means to an element whose movement and/or position is being detected. The entire slider 56 can be made of ferromagnetic material, or alternatively, for example, the inclined surface 60 can be provided with a strip of ferromagnetic material as the target.

The sensor 70 is disposed with respect to the slider 56 so that as the slider moves left and right (as viewed in FIG. 5) the inclined surface 60 coacts with the sensor 70 to produce a varying gap between the ferromagnetic target and the sensor 70. This varying gap modulates the magnetic field produced by the sensor 70 and hence modulates the polarization rotation of the sensor light (as described in the referenced patent).

Figure 6:
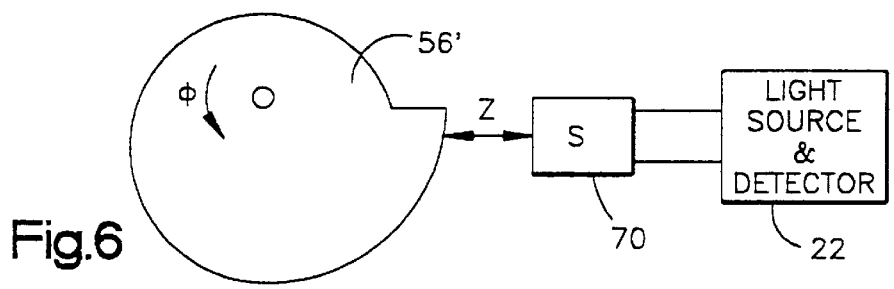
Figure 7:
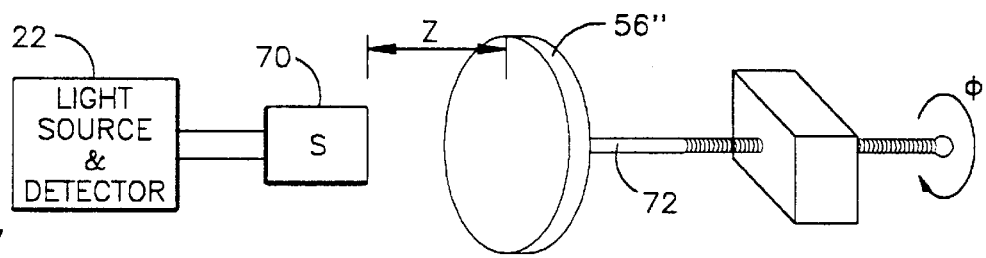
Figure 8:
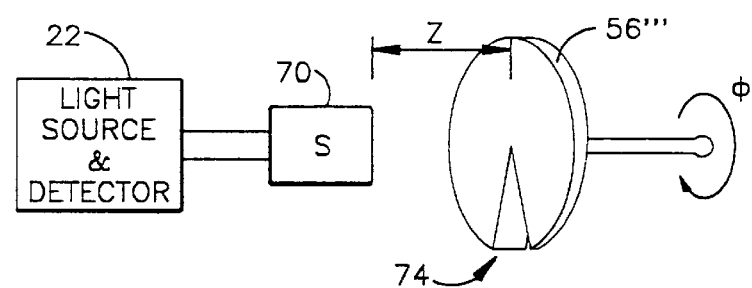

The use of a variable gap to modulate the sensor 70 magnetic field can further be used to realize a rotational or angular displacement sensor. Various embodiments of such apparatus are illustrated in FIGS. 6–8. The basic elements of these embodiments are the same as the embodiment of FIG. 5 and like reference numerals are used for like elements. In each case, the sensor 70 detects displacement of a target (56', 56" or 56'''). The target essentially functions as a transducer that converts rotation or angular displacement $\phi$ into linear displacement "z". The linear displacement in turn is used to vary the gap between the target and the sensor 70. In FIG. 6 the target 56' is a cam like structure that has an angularly varying radius that varies in relation to φ. In FIG. 7, the target 56" is represented as a simple disk that moves along the "z" direction under the influence of a screw driven shaft 72. In FIG. 8, the target 56''' has a width or thickness 74 that varies in relation to the rotational position thereof.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. Apparatus for detecting relative displacement comprising: first magnetic means for producing a first magnetic field; second magnetic means for producing a second magnetic field; said first and second magnetic fields interacting to produce a position-dependent magnetic field; a magneto-optic sensor disposed for detecting said position-dependent magnetic field by Faraday effect and for producing a polarized light output indicative of said detected magnetic field in accordance with said Faraday effect; and means for causing a relative displacement between said position-dependent magnetic field and said sensor.

2. The apparatus of claim 1 wherein said first and second magnetic means each comprise a ring magnet disposed in a fixed spatial relationship to each other.

3. The apparatus of claim 2 wherein said ring magnets are mounted in a common housing with said sensor disposed in said housing along an axis, said housing being slidable along said axis.

4. The apparatus of claim 1 wherein said first and second magnetic means comprise respective permanent magnets disposed in a common housing that can be displaced relative to said sensor.

5. The apparatus of claim 1 wherein said magneto-optic sensor comprises means for transmitting polarized light bi-directionally along an optical path through a Faraday material.

6. The apparatus of claim 1 wherein said position-dependent magnetic field exhibits a null point along an axis between said first and second magnetic means and increases in intensity along said axis away from said null point.

7. The apparatus of claim 6 wherein said position-dependent magnetic field exhibits a polarity reversal on opposite sides of said null point along said axis.

8. The apparatus of claim 1 wherein said sensor is spatially fixed with respect to a displaceable element, and said means for causing a relative displacement is acted on by the element to move in relation thereto.

9. The apparatus of claim 1 wherein said first magnetic means comprises a permanent magnet disposed in a single common housing with said sensor.

10. The apparatus of claim 1 wherein said sensor comprises a bi-directionally interrogated magneto-optic sensor.

11. Apparatus for detecting position comprising: a sensor housing; a permanent magnet disposed in said housing for producing a magnetic field; a magneto-optic sensor disposed in said housing for detecting by Faraday effect variations in said magnetic field across a gap between said sensor housing and a ferromagnetic target; and means for varying said gap in relation to linear position of the target.

12. The apparatus of claim 11 wherein said gap varying means comprises a body having an inclined surface juxtaposed with respect to said sensor, said body being adapted for movement such that the gap distance between said sensor and said inclined surface varies in relation to movement of the target.

13. The apparatus of claim 11 wherein linear displacement of the target is related to rotational displacement of an element.

14. The apparatus of claim 11 wherein said gap varying means operates to translate rotational displacement of an element into linear movement of the target to vary said gap.

* * * * *